United States Patent [19]

Reisner et al.

[11] 4,074,313
[45] Feb. 14, 1978

[54] ELECTRON BEAM DISC RECORDER

[75] Inventors: John Henry Reisner, Haddonfield; William Henry Morewood, Pennington; George Herbert Needham Riddle, Princeton, all of N.J.

[73] Assignee: RCA Corporation, New York, N.Y.

[21] Appl. No.: 701,416

[22] Filed: June 30, 1976

[30] Foreign Application Priority Data

June 14, 1976 United Kingdom ............... 24561/76

[51] Int. Cl.$^2$ ............................................. H04N 5/76
[52] U.S. Cl. ........................... 358/128; 179/100.1 B; 179/100.3 V; 358/129; 346/151; 346/161
[58] Field of Search ............... 358/128, 129, 130, 132, 358/127; 340/173 TP, 173 CR; 179/100.3 V, 100.1 B, 100.4 C, 100.4 R, 100.3 A; 346/158, 159, 151, 161

[56] References Cited

U.S. PATENT DOCUMENTS

| | | | |
|---|---|---|---|
| 3,120,991 | 2/1964 | Newberry | 340/173 TP |
| 3,423,524 | 1/1969 | Bradford | 358/128 |
| 3,821,488 | 6/1974 | Plows | 179/100.4 C |
| 3,825,323 | 7/1974 | Landwer | 358/128 |
| 3,842,194 | 10/1974 | Clemens | 358/128 |

*Primary Examiner*—Vincent P. Canney
*Assistant Examiner*—Alan Faber
*Attorney, Agent, or Firm*—Eugene M. Whitacre; William H. Meagher; Dilip A. Kulkarni

[57] ABSTRACT

A disc master, coated with an electron sensitive material, is secured to a turntable which is rotatably mounted within a vacuum chamber. A recorder column protrudes into the vacuum chamber for directing a signal representative electron beam toward the disc master. The recorder column is mounted on a carriage for translational motion along a path radially disposed with respect to the center of rotation of the turntable in correlation with the rotational motion of the turntable. A column set-up stage is mounted within the vacuum chamber, adjacent the outside perimeter of a turntable supported disc master, and in registration with the coated surface of the disc master. The recorder column is aligned with the set-up stage for determining beam characteristics, such as: beam current, shape, quality, etc., and for properly focusing the electron beam.

7 Claims, 11 Drawing Figures

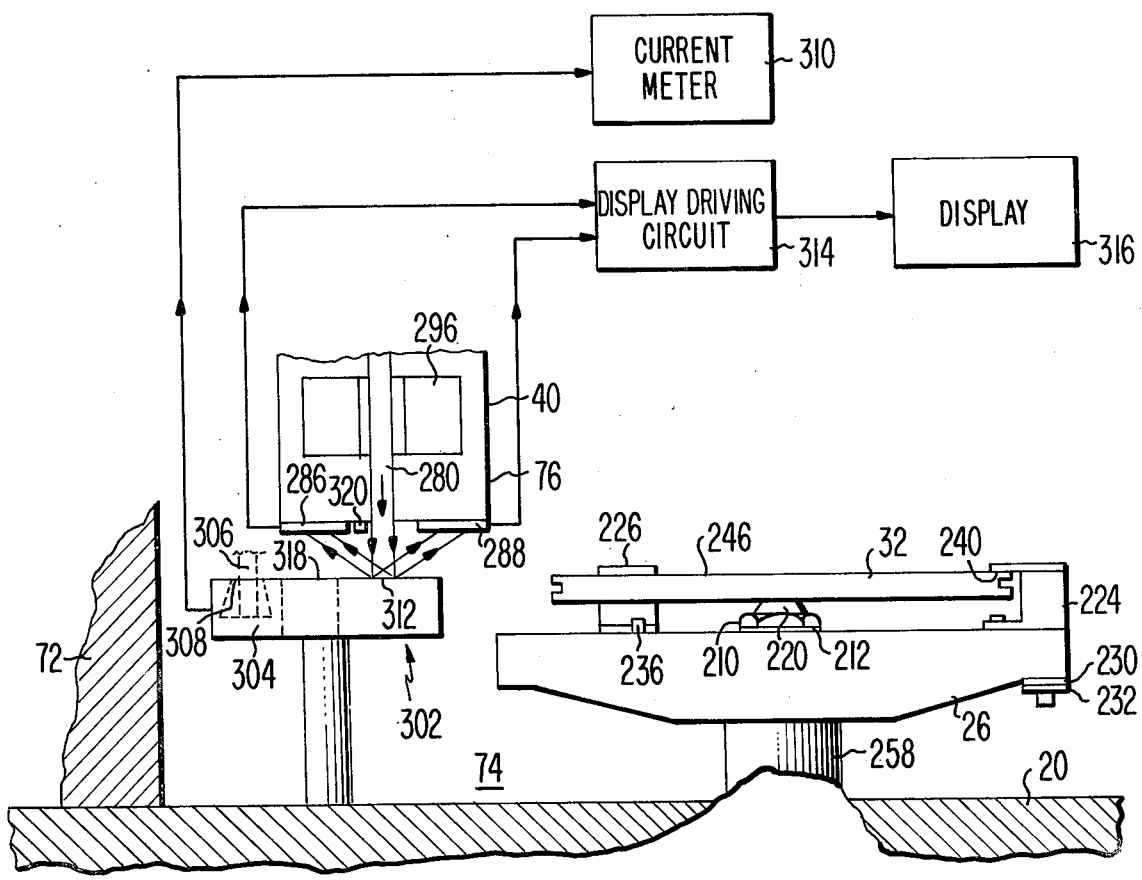
Fig. 11
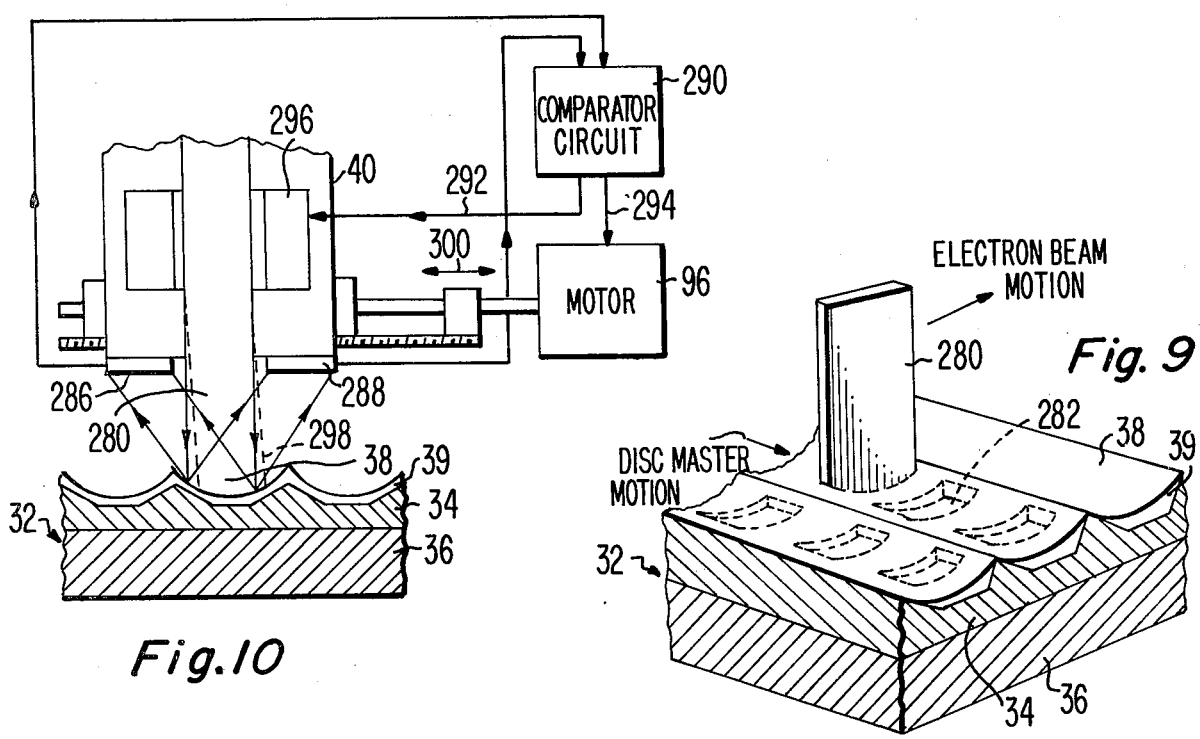
Fig. 10
Fig. 9

ELECTRON BEAM DISC RECORDER

This invention relates to an apparatus for recording high frequency signals on a disc master. More particularly, an apparatus is herein disclosed for recording video signals by applying a signal representative electron beam to a surface of a disc master coated with electron sensitive material.

In U.S. Pat. No. 3,943,275 (Jebens, et al.), an electron beam disc recorder apparatus is disclosed for recording video signals along a spiral track on the surface of a disc master by applying a signal representative electron beam, provided by a stationary recorder column, to a surface of the disc master which is coated with an electron sensitive material, as the disc master is rotated and translated within a vacuum chamber by a turntable support system. As disclosed therein, the turntable rotational drive system and rails which support the translational motion of the turntable are located within the vacuum chamber. An oil propulsion system is used to cause rotational motion of the turntable in the vacuum chamber, since an electric rotational drive is difficult to construct within the vacuum chamber, and since it may produce magnetic fields which could interfere with the electron beam.

Pursuant to the present invention, a recorder column is mounted on a carriage for translational motion relative to a rotating, but non-translatory, turntable. The separation of the translatory motion from the rotational motion is advantageous for several reasons. It permits location of the turntable support and drive system outside the vacuum chamber. Location of the turntable support and drive system outside the vacuum chamber is desirable as it permits use of an external electric drive for the turntable. Elimination of the oil propulsion system, for example, of the type disclosed in the U.S. Pat. No. 3,943,275, from the vacuum chamber is advantageous in that it provides an oil-free vacuum chamber for recording by the electron beam on the disc master. Such an arrangement has also permitted a reduction in the volume of the vacuum chamber, for example, by a factor of four. The reduction in the volume of the vacuum chamber is advantageous because it results in a significant reduction in the pumping down time, thus shortening the operating cycle.

In order to properly record video-type signals by an electron beam on a surface of the disc master coated with an electron sensitive material, it is desirable that the image of the source of the electron beam on the coated surface of the disc master have appropriate size, shape, and current density. Moreover, the distribution of the current density should be fairly uniform and symmetric in the image. Furthermore, the image of the source on the coated surface of the disc master must be properly focused. To assure an appropriate image of the electron source on the disc master, it is desirable to provide means for verifying the size, shape, current density, current distribution, and focusing of the electron image at the coated surface of the disc master.

For such image verification, one may, for example, mount the source on a separate electron optical bench which would magnify the image and display it in a manner suitable for examination. The above-said technique gives excellent data on the source, but requires removal of the source from the recorder column for examination. Such a procedure is undesirable since it provides no assurance that the source characteristics are not distributed during the transfer. Moreover, the technique requires a substantial investment in a separate electron optical bench and represents a sizable inconvenience in the transfer procedure. Furthermore, this technique fails to aid in focusing the image of the source on the electron-responsive surface of the disc master.

Alternatively, one may deposit a specimen, comprising very small particles of electron-reflective material, such as platinum, against an electron-absorbing background, such as graphite, on coated surface of the disc master. The electron beam is then scanned across the specimen in a television raster manner and the electrons scattered by the highly reflective particles are detected for examination of the size, shape, current density, distribution, etc., of the electron source. In a similar manner, structures, such as small gold particles, may be placed on the surface of the disc master to enable focusing of the image of the source on the electron-responsive surface of the disc master. A disadvantage of the use of such procedures is the risk of spurious exposure of the electron-responsive surface of the disc master. Moreover, use of such procedures requires that each disc master be prepared with a specimen and a focusing structure prior to recording, which means additional expense and inconvenience.

Another technique for image verification is disclosed in U.S. Patent Application, Ser. No. 613,535 (Riddle), now U.S. Pat. No. 4,010,318. The Riddle application discloses a dual mode recorder column which is operable in either a set-up mode or a record mode. In the set-up mode, the electron source is magnified in an image plane located above the disc master for examination of the source by a Faraday cup which is swung into the path of the electron beam. In the record mode, the Faraday cup is swung out of the path of the electron beam, and the electron source is demagnified for recording video signals on the electron-responsive surface of the disc master. Such a procedure requires a recorder column which is also capable of magnifying the source for examination. Moreover, this technique does not make provision for focusing the image of the source on the electron-responsive surface of the disc master.

Pursuant to the present invention, a set-up stage is mounted in the vacuum chamber, adjacent the outside perimeter of a turntable-supported disc master, and oriented in registration with a surface of the disc master coated with electron sensitive material. The translatable carriage serves to position the recorder column in alignment with the set-up stage for examination of the source. Such an arrangement is advantageous in that it overcomes the aforementioned deficiencies.

In an illustrative embodiment of the present invention, the turntable is rotatably mounted to a base plate secured to a frame, while the carriage, carrying the recorder column, is mounted for translational motion on a cover plate. Pursuant to another feature of the invention, the cover plate is mounted on the frame for a reciprocal motion relative to the base plate between a position overlying the base plate for forming the vacuum chamber, and a position out of registry with a portion of the base plate which forms the vacuum chamber. The cover plate in the out-of-registry position permits access to the disc master supporting surface of the turntable, and to that portion of the recorder column which protrudes into the vacuum chamber during recording operations.

Figure 1:
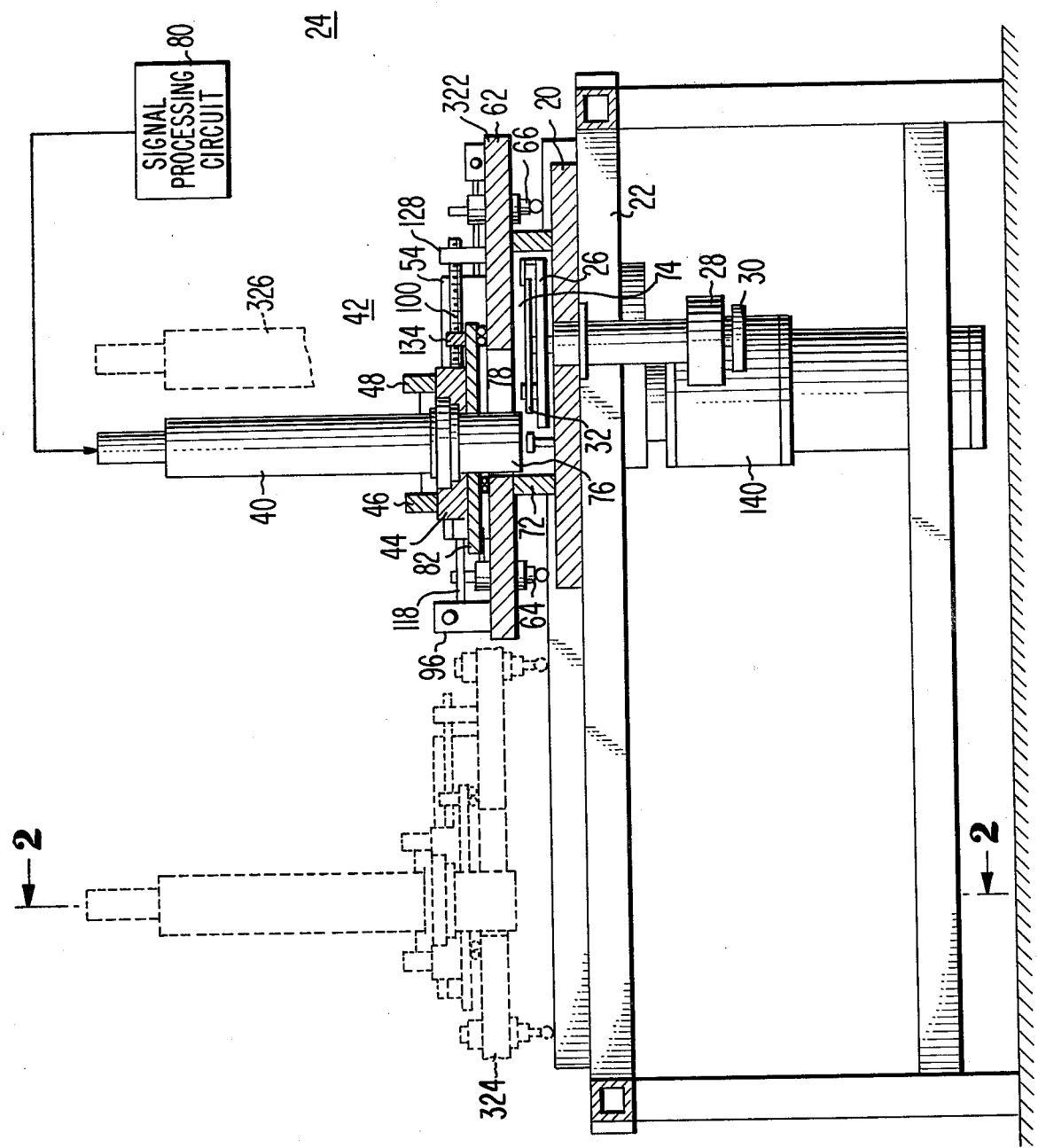
FIG. 1 is a diagrammatic representation of a side view, partly in section, of an electron beam disc recorder in accordance with the present invention.
Figure 2:
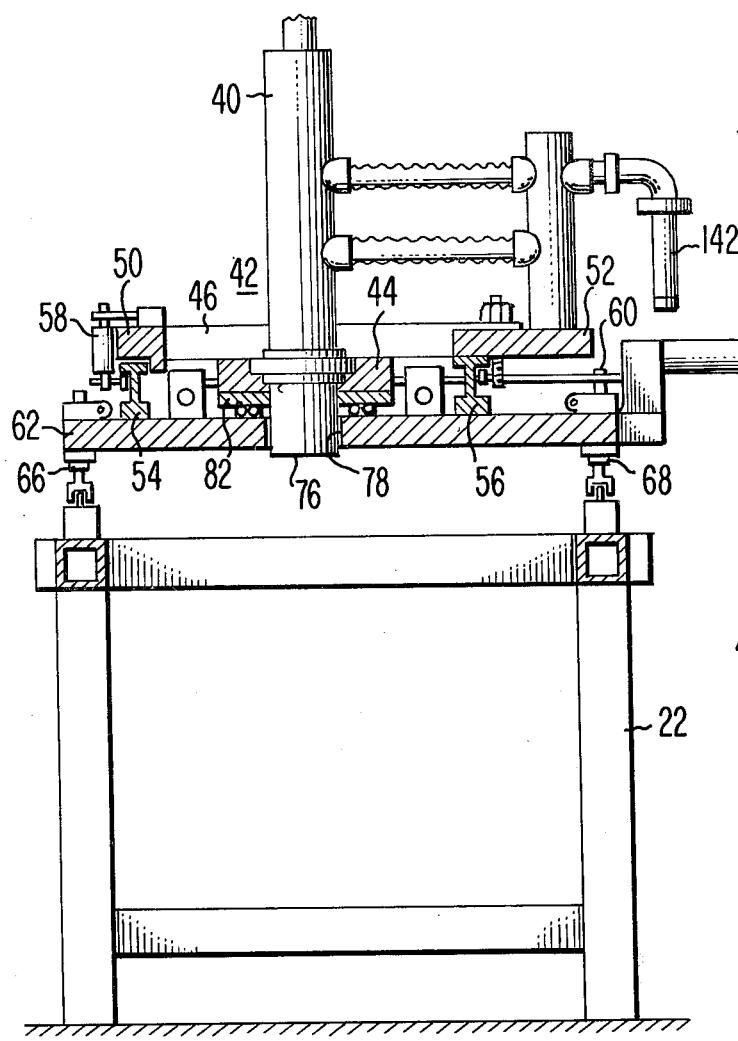
FIG. 2 is also a diagrammatic representation of a front view, partly in section along line 2—2 in FIG. 1, of the electron beam disc recorder.
Figure 7:
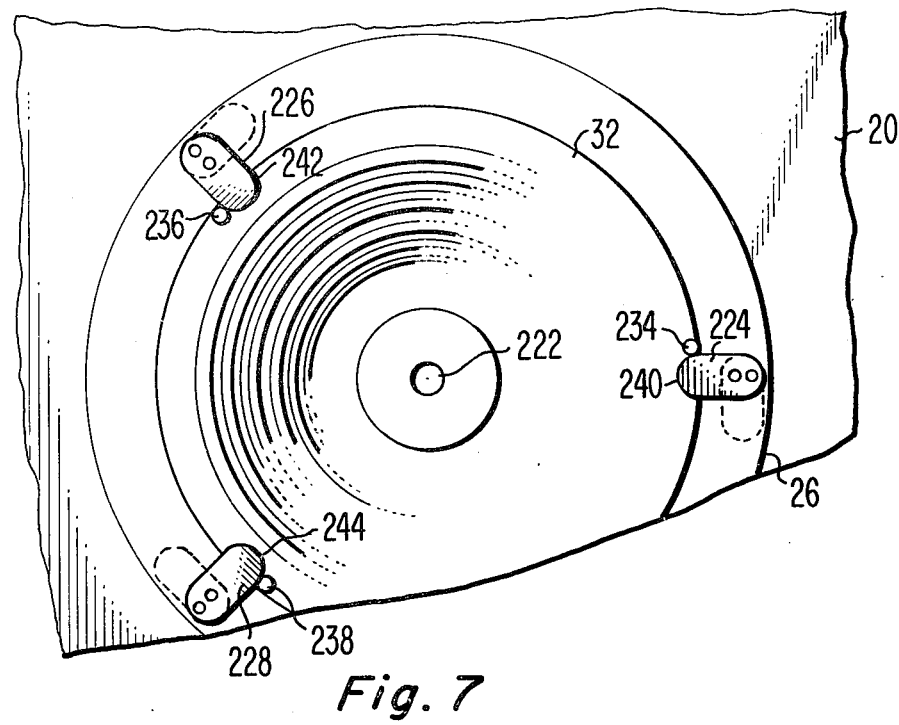
Figure 8:
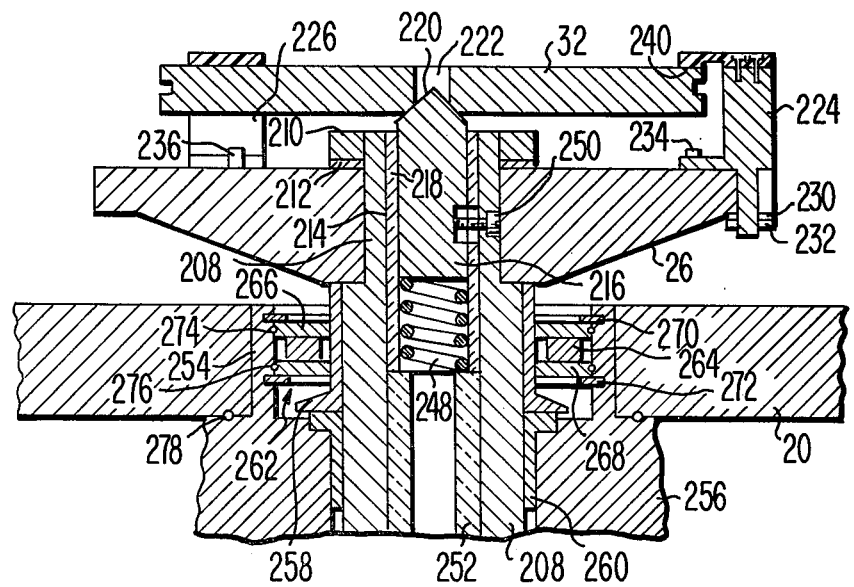

FIGS. 7 and 8 show a plan view and a sectional end view of an arrangement for positioning a disc master on a turntable of the electron beam disc recorder of FIGS. 1 and 2; FIG. 8 also showing a rotary seal between the turntable shaft and a base plate of the electron beam disc recorder of FIGS. 1 and 2;

FIG. 9 shows a portion of the disc master which is partly exposed by an electron beam provided by the recorder column of FIGS. 1 and 2;

FIG. 10 is a schematic representation of a system for centering the electron beam in a spiral groove disposed on the surface of the disc master, for use in the electron beam disc recorder of FIGS. 1 and 2; and FIG. 11 is a block diagram of a system for verifying the source of the electron beam, for use in the electron beam disc recorder of FIGS. 1 and 2.

In FIG. 1, a base plate 20 is secured to a frame 22 of the electron beam disc recorder 24. A turntable 26 is rotatably mounted to the base plate 20. A motor 28 is provided for causing rotational motion of the turn-table 26. A speed control system 30 maintains the rotational speed of the turntable at a predetermined level during recording operation. A pregrooved disc master 32 is supported on the turntable 26.

FIG. 9 shows a cross-sectional view of a portion of the disc master 32. A thin layer of copper 34 is deposited on an aluminum substrate 36. In an illustrative mode of disc master preparation, as described in the U.S. Pat. No. 3,882,214 (Nosker), a generally spiral groove 38 is machined on the surface of the copper layer 34, and the grooved surface of the copper layer 34 is coated with a thin deposit 39 of an electron sensitive material.

Figure 4:
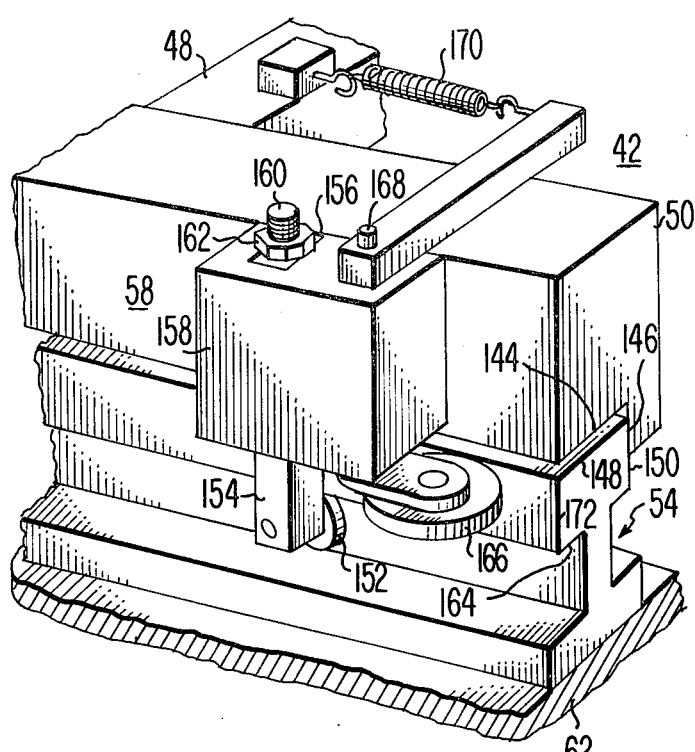
FIG. 4 is a perspective view of an arrangement for slidably securing a carriage, carrying the recorder column of FIGS. 1 and 2, to the cover plate of FIG. 3.

As shown in FIG. 1 and 2, a recorder column 40 is mounted on a carriage 42. The carriage 42 comprises a platform 44 secured to connecting members 46 and 48. Cross members 50 and 52 are secured to the end portions of the connecting members 46 and 48. The cross members 50 and 52 ride on a pair of I-shaped rails 54 and 56 for supporting translational motion of the carriage 42. Assemblies 58 and 60 are provided for securing the carriage 42 to the rails 54 and 56. The assembly 58 additionally serves to properly locate the carriage 42 relative to the rails 54 and 56. FIG. 4 shows a perspective view of the assembly 58.

Figure 3:
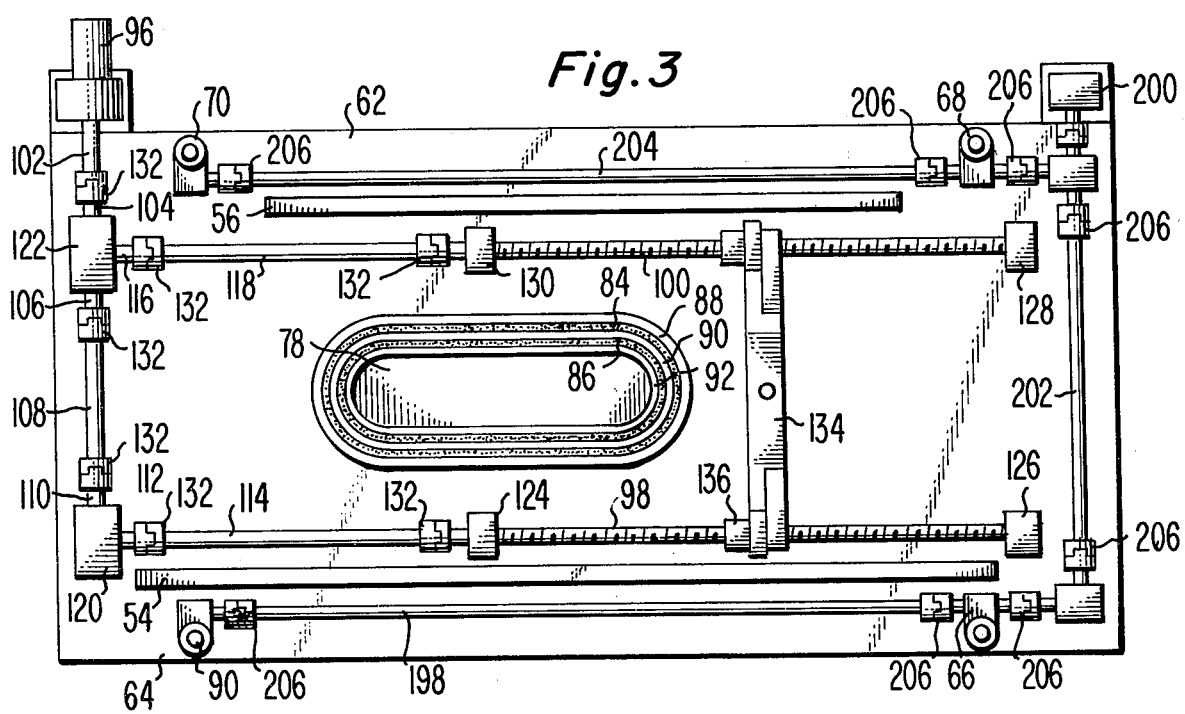
FIG. 3 is a top view of a cover plate on which a recorder column of the electron beam disc recorder of FIGS. 1 and 2 is mounted for translational motion.
Figure 5:
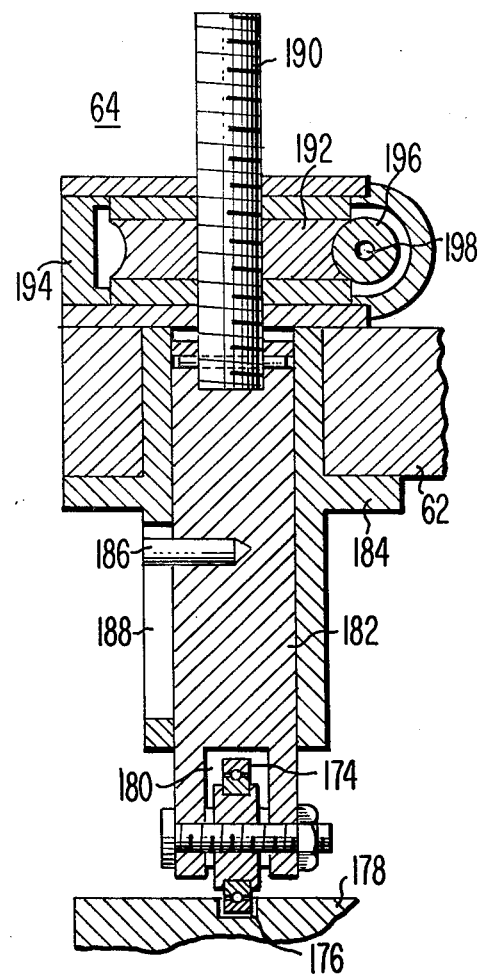
FIG. 5 is a sectional view of a lifter assembly secured to the cover plate of FIG. 3.

Referring again to FIG. 2, the I-shaped rails 54 and 56 are mounted on a cover plate 62. The cover plate 62 is mounted on the frame 22 for a reciprocal motion relative to the base plate 20 by a set of lifter assemblies 64, 66, 68 and 70. FIG. 3 shows a plan view of the cover plate 62. FIG. 5 shows a cross-sectional view of a lifter assembly.

The cover plate 62 is movable between a position 322 overlying a collar 72 secured to the base plate 20 (shown by solid lines in FIG. 1) to form a recording chamber 74, and a position 324 out-of-registry with the collar 72 (shown in phantom in FIG. 1) to permit loading/ removal of the disc master 32 on the turntable 26. The cover plate 62 in the out-of-registry position 324 additionally permits access to a lower portion 76 of the recorder column 40 for cleaning, servicing, etc.

The recorder column 40 is seated precisely in an opening provided in the platform 44. The cover plate 62 has an oblong opening 78, as shown in FIG. 3, through which the lower portion 76 of the recorder column 40 projects into the recording chamber 74 for directing a signal representative beam of electrons toward the electron-responsive surface of the disc master 32. The position of the recorder column 40 over the disc master 32 is shown by the numeral 326 in FIG. 1. The dimensions of the oblong opening 78 are sufficient to accommodate the translational motion of the recorder column 40.

The recorder column 40 basically includes a source for providing a beam of electrons and a set of lenses for demagnifying the electron source on the electron-responsive surface of the disc master 32. Illustratively, the electron source may be of the type disclosed in a copending U.S. Pat. Application, Ser. No. 613,534 (Riddle & Demers), now U.S. Pat. No. 3,997,807, and the demagnifying lenses may be of the type shown in a copending U.S. Patent Application, Ser. No. 613,535 (Riddle), now U.S. Pat. No. 4,010,318. A signal processing circuit 80 is coupled to the recorder column 40 for modulating the electron beam in accordance with the signal to be recorded on the electron-responsive surface of the disc master 32.

Figure 6:
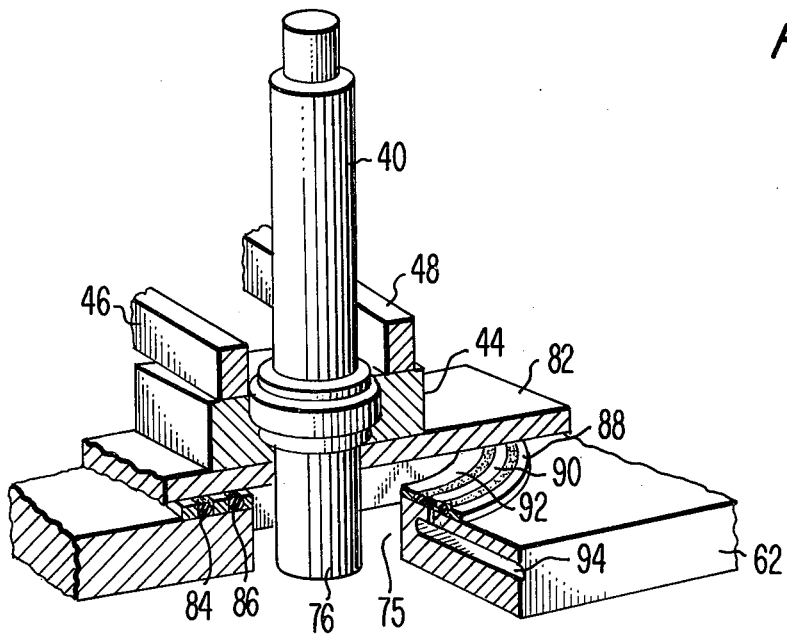
FIG. 6 illustrates a sliding seal between the recorder column of FIGS. 1 and 2 and the cover plate of FIG. 3.

A sealing plate 82 is secured to the platform 44 in order to cover the oblong opening 78 in the cover plate 62 as shown in FIG. 6. A set of O-rings 84 and 86 are mounted in a corresponding set of channels formed in the cover plate 62 as depicted in FIG. 3. The channels are formed by a set of elliptical elements 88, 90, and 92. The seal compression is obtained by supporting the weight of the recorder column 40 and vacuum load of the carriage 42 on the I-shaped rails 54 and 56. When, as in this particular embodiment, two O-rings 84 and 86 are used, the space between them may be evacuated through a tubular opening 94 (FIG. 6) in the cover plate 62 to improve the vacuum integrity of the recording chamber 74. Alternatively, the space between the O-rings 84, 86 may be filled with vacuum grease.

The compression of O-rings 84 and 86 is adjusted to a predetermined value by varying the height of locating surfaces of the I-shaped rails 54 and 56. On the one hand, too much compression of the O-rings 84 and 86 may result in a disturbing jitter of the recorder column 40 due to the break-away friction between the sealing plate 82 and O-rings 84 and 86 during translation of the recorder column. On the other hand, too little compression of the O-rings 84 and 86 may jeopardize the vacuum integrity of the recording chamber 74. The correct compression of the O-rings 84 and 86 permits a smooth translational motion of the recorder column 40, and, at the same time, facilitates maintenance of proper vacuum in the recording chamber 74.

As shown in FIG. 3, a motor 96 drives a set of lead screws 98 and 100 via a set of connecting shafts 102, 104, 106, 108, 110, 112, 114, 116 and 118. Gear boxes 120 and 122 are interposed between the motor 96 and the lead screws 98, and 100 to, inter alia, reduce the speed of rotation of the lead screws. The lead screws 98 and 100 are supported by bearing blocks 124, 126, 128 and 130. Universal couplings 132 are used to eliminate problems, such as vibration, due to non-alignment of interconnecting shafts.

An equalizing bar 134 is fastened to a pair of nuts 136, 138. The equalizing bar 134 is secured to the sealing plate 82 (FIG. 1). The nuts 136 and 138, respectively, engage the lead screws 98 and 100 for causing translational motion of the carriage 42 which carries the recorder column 40. The afore-described recorder column traversing arrangement advantageously permits the translational motion causing force to be in alignment with the centerline of the recorder column/ carriage assembly.

The orientation of the rails 54, 56 supporting the translational motion of the carriage 42, is such that the translational motion of the carriage results in motion of the electron beam, provided by the recorder column 40, along a path radially disposed with respect to the center of rotation of the turntable supported disc master 32.

A diffusion pump 140 (FIG. 1) is connected to the recording chamber 74 for evacuation thereof. Another diffusion pump 142 (FIG. 2) is coupled to the recorder column 40 for its evacuation. The diffusion pumps 140 and 142 provide a vacuum environment for the electron beam recording operation on the electron-responsive disc master 32.

FIG. 4 is a perspective view of an arrangement for securing the carriage 42 to the rail 54. As shown therein, the cross member 50 of the carriage 42 has a set of right-angled bearing surfaces 144 and 146 which rest against the locating surfaces 148 and 150 of the I-shaped rail 54. In order to keep the bearing surface 144 of the carriage 42 in engagement with the locating surface 148 of the rail 54, a roller 152 is secured to a sliding member 154. The sliding member 154 is reciprocably mounted in a slot 156 provided in a block 158 which is affixed to the cross member 50. The sliding member 154 has a threaded portion 160 protruding beyond the slot 156. A nut 162 holds the roller 152 against a locating surface 164 of the I-shaped rail 54.

In order to keep the bearing surface 146 of the carriage 42 in engagement with the locating surface 150 of the rail 54, a roller 166 is pivotally mounted by a pin 168 to the block 158. A spring 170 maintains the roller 166 against a locating surface 172 of the I-shaped rail 54.

FIG. 5 shows a sectional view of the lifter assembly 64. The lifter assemblies 64, 66, 68, 70 basically serve two purposes. They lift the cover plate 62 off the collar 72 so that the lower protruding portion 76 of the recorder column 40 may clear the top surface of the collar to permit movement of the cover plate from the overlying position 322 (shown by solid lines in FIG. 1) to the out-of-registry position 324 (shown in phantom in FIG. 1). Secondly, the lifter assemblies 64, 66, 68, 70 are provided with ball bearing rollers, such as 174 in FIG. 5, so that the cover plate 62 can be rolled to the out-of-registry position 324 to permit, inter alia, access to a turntable supported disc master. As previously indicated, the cover plate 62 is the out-of-registry position 324 permits access to the lower protruding portion 76 of the recorder column 40 for cleaning, servicing, etc.

As shown in FIG. 5, the ball bearing roller 174 is mounted for rotational motion in a slot provided in a shaft 182. The ball bearing roller 174 rides in a groove 176 provided in a way 178 secured to the frame 22. The groove 176 properly locates the cover plate 62 with respect to the frame 22. The ball bearing roller 174 is rotatably mounted in a slot 180 provided in a shaft 182. The shaft 182 is reciprocably mounted in a sleeve 184 secured to the cover plate 62. A pin 186 secured to the shaft 182 slides in a slot 188 provided in the sleeve 184 to prevent the shaft 182 from rotating.

A screw 190 is secured to the upper end of the shaft 182. A nut 192 is rotatably mounted in a housing 194 secured to the cover plate 62. The nut 192 has internal threads for engagement with the screw 190, and external threads for engagement with a worm 196 rotatably mounted to a shaft 198. When the shaft 198 is rotated, the cover plate 62 is lifted away from the way 178 secured to the frame 22.

FIG. 3 shows a motor 200 which drives a set of shafts 198, 202, 204 to cause the lifter assemblies 64, 66, 68, 70 to lift and lower the cover plate 62. Universal couplings 206 are provided to prevent problems, such as vibrations, from occurring due to non-alignment of interconnecting shafts.

FIGS. 7 and 8 show a plan view and a secontional end view of an arrangement for positioning the disc master 32 on the turntable 26. As shown in FIG. 8, the turntable 26 is secured to a shaft 208 by a nut 210 and a washer 212. The turntable shaft 208 has a central opening 214 in which a centering spindle 216 is snugly received for reciprocale motion along the axis of rotation of the turntable shaft 208. A sleeve 218 is interposed between the centering spindle 216 and the turntable shaft 208 to electrically isolate the centering spindle from the turntable support system.

A portion 220 of the centering spindle is tapered for engagement with walls defining a centering aperture 222 of the disc master 32 in order to center the disc master with respect to the axis of rotation of the turntable 26.

As shown in FIG. 7, three axial locating members 224, 226, 228 are mounted to the peripheral portion of the turntable 26, for example, as shown by a washer 230 (FIG. 8) and a clamping split-ring 232 (FIG. 8). The axial locating members 224, 226, 228 are movable between a first location, shown by solid lines in FIG. 7, and a second location, shown by dotted lines in FIG. 7. Stop pins 234, 236, 238 are secured to the turntable 26 to assure accurate positioning of the axis locating members 224, 226, 228 in the first locations.

The axial locating members 224, 226, 228 have disc master-engaging ends 240, 242, 244 which define a recording plane 246 (FIG. 8) in which the recorder column 40 focuses the electron beam. The axial locating members 224, 226, 228 in the second locations (shown in phantom in FIG. 7) place the disc master-engaging ends 240, 242, 244 outside the path of travel of a disc master, to-and-from a position of centered engagement with the centering spindle 216, to permit, respectively, installation and removal of the disc master.

A spring 248 located in the turntable shaft central opening 214 biases the centering spindle 216 in a direction that causes the tapering portion of the centering spindle 216, in engagement with the walls of the central aperture 222 of the disc master 32, to urge the disc master against the disc master-engaging ends 240, 242, 244 when the axial locating members 224, 226, 228 are occupying the first locations (shown by the solid lines in FIG. 7) to locate the electron-responsive surface of the disc master in alignment with the recording plane defined by the disc master-engaging ends of the axial locating members.

The above-discussed disc master locating system is the subject matter of a copending U.S. Pat. application, Ser. No. 701,417, filed June 30, 1976, of J. Guarracini, entitled "DISC MASTER POSITIONING APPARATUS FOR A RECORDING SYSTEM", and concurrently filed herewith.

A set screw 250 prevents the centering spindle 216 from being ejected out of the turntable shaft central opening 214 in the absence of a disc master on the turntable 26. A sleeve 252 is interposed between the spring 248 and the turntable shaft 208 to electrically isolate the centering spindle 216 from the turntable support system.

As shown in FIG. 8, the turntable shaft 208 protrudes outside the recording chamber 74 through an opening 254 in the base plate 20. A housing 256 is secured to the base plate 20. A sleeve 258, press-fitted to the turntable shaft 208, rests on a bushing 260 mounted in the housing 256. Bonding material is interposed between the turntable shaft 208 and the sleeve 258 to prevent air from leaking into the recording chamber 74 upon evacuation thereof.

A rotary seal 262 is interposed between the housing 256 and the sleeve 258 mounted on the turntable shaft 208. The rotary seal 262 comprises an annular permanent magnet 264 sandwiched between annular pole pieces 266 and 268. Clamping rings 270, 272, secured to the housing 256, hold the permanent magnet 264 and the pole pieces 266 and 268 in place. A fluid containing finely divided particles of iron is interposed between the pole pieces 266 and 268 and the sleeve 258 mounted on the turntable shaft 208. The rotary seal 262 prevents air from leaking into the recording chamber 74 upon evacuation thereof. O-rings 274, 276 and 278 are provided to maintain the vacuum integrity of the recording chamber 74. The rotary seal 262 may be of a type manufactured by FERROFLUIDICS CORPORATION, located in Burlington, Massachusetts.

As previously indicated, the turntable support system and the turntable drive system are mounted external to the recording chamber 74 for several reasons. Such an arrangement reduces the volume of the recording chamber 74. Additionally, it keeps the recording chamber 74 clean from contamination. The electric motor 28 for driving the turntable 26 may be of a type manufactured by KOLLMORGEN CORPORATION, located in Glen Cove, N.Y.

FIG. 9 is a diagrammatic representation of an electron beam recording operation effected by the apparatus of FIGS. 1 and 2. The electron-responsive surface of the disc master 32 is successively exposed by a signal-modulated, ribbon-shaped electron beam 280, provided by the recorder column 40, to record signal elements 282, along the spiral groove 38 disposed on the disc master, in accordance with video-representative signal information. The electron-responsive surface of the disc master is then developed which causes the exposed portions thereof to be removed, to form a topography in the spiral groove 38 corresponding to the video-representative signal information. A nickel replication is made of the resultant disc master and this replication is utilized to stamp or emboss vinyl records. The vinyl replica is then metalized to make the surface conducting and the metalization is thereafter coated wih a dielectric. In playing back the recorded information, a stylus is caused to ride in the dielectric-coated groove. This stylus, along with the metalization and dielectric, acts as a capacitor. Capacitance variations in the groove, which correspond to the recorded video information, are then detected electronically to recover the video information. A video disc system of this type is generally disclosed in U.S. Pat. No. 3,842,194 (Clemens).

FIG. 10 shows an arrangement for keeping the electron beam 280 centered in the groove 38 disposed on the surface of the disc master 32. As shown therein, the off-center electron beam 280 is reflected by the walls of the groove 38. The reflected electrons are sensed by radially disposed detectors 286 and 288. If the electron beam 280 is located slightly to the left of its centered position in the spiral groove 38, more energy is detected by the detector 288, located to the right of the electron beam, as compared with the detector 286. The outputs of the detectors 286 and 288 are coupled to a differential amplifier included in a comparator 290. The comparator 290 generates two error signals on leads 292 and 294. The error signal developed on the lead 292 is a function of instantaneous error in the centered position of the electron beam 280, and is applied to a deflection system 296. As shown by the dotted lines 298 in FIG. 10, the deflection system 296 serves to center the electron beam 280 in the spiral groove 38. The error signal developed on the 294 is a function of average error in the centered position of the electron beam 280, and is applied to the motor 96 which provides translational motion 300 to the recorder column 40. The deflection system 296 and the variation in the speed of the motor 96, together, serve to center the electron beam 280 in the spiral groove 284 throughout the range of recording on the disc master 32.

FIG. 11 shows an arrangement for preparing the source of the electron beam 280. As shown therein, a column set-up stage 302 is mounted to the base plate 20 within the recording chamber 74. The column set-up stage 302 is located adjacent the outside perimeter of the turntable supported disc master 32 with its focusing surface in registration with the recording plane 246. The motor 96, which provides the desired translational motion of the recorder column 40 during recording operations, additionally serves to selectively position the recorder column 40 over the column set-up stage 302 for determining electron beam characteristics, such as, current density, current distribution, shape, quality, proper focus, etc.

The column set-up stage 302 includes a Faraday cup 304 into which the electron beam is injected for determining the current of the electron beam. In order to direct the electron beam into the Faraday cup 304, the recorder column 40 is translated to a position such that the electron beam, shown by the dotted lines 306, is aligned with an entrance window 308 of the Faraday cup 304. A current meter 310 is coupled to the Faraday cup 304 for determining the beam current.

In order to determine the shape, distribution, quality etc., of the electron beam, a specimen 312 is formed on the column set-up stage 302 by depositing small particles of an electron-scattering material, such as platinum, dispersed in an electron-absorbing background material, such as graphite (e.g., carbon aquadag). The deflection system 296 also serves to scan the electron beam 280 across the specimen 312 in a television raster manner. The electrons scattered by the specimen 312 are detected by the same detectors 286 and 288, which are additionally utilized for deriving groove tracking information during recording operations. The output of the detectors 286 and 288 are added and amplified by a display driving circuit 314. A display 316 is coupled to the output of the display driving circuit 314 for displaying the electron beam shape, distribution, etc. The information obtained from the current meter 310 and the display 316 is utilized to obtain proper intensity and distribution of the electron beam 280 on the recording plane 246.

In order to assure a proper focus of the electron beam on the electron-responsive surface of the disc master 32, a focusing structure 318 (FIG. 11) is placed on the surface of the column set-up stage 302 which is in registration with the electron-responsive surface of the disc master 32. The focusing structure 318 may include a number of very small spaced-apart balls (e.g., 1 micrometer in diameter) of highly electron-reflective material (e.g., gold). The focusing structure 318 is, a seriatim, scanned by the electron beam in the radial and the tangential directions. The electrons reflected by the gold balls are detected by the detectors 286 and 288. The output of the detectors 286 and 288 is summed by the display driving circuit 314 to develop a pulse waveform for projection on the display 316, with the shape of the waveform, developed as the electron beam traverses a gold particle, providing an indication of the sharpness of focus. The demagnifying lenses in the recorder column 40 are adjusted to give a sharp image of the electron beam on the registered surface of the column set-up stage 302.

A height sensor 320 (FIG. 11) is secured to the lower protruding portion 76 of the recorder column 40 to sense the height of the lower protruding portion of the recorder column relative to either the registered surface of the column set-up stage 302 or the electron-responsive surface of the disc master 32. The height sensor 320 generates an error signal which is representative of variation in the height of the electron-responsive surface of the disc master 32 relative to the height of the registered surface of the column set-up stage 302 due to imperfect machining or mounting of the disc master. The demagnifying lenses in the recorder column 40, responsive to the error signal, adjust the focal length of the final demagnifying lens in order to maintain proper focus of the image of the electron beam on the electron-responsive surface of the disc master 32 throughout the range of translational motion of the recorder column over the disc master. The height sensor 320 may be of a type manufactured by ADE CORPORATION of Watertown, Mass.

While the description of the apparatus disclosed herein makes reference to a beam of electrons, it is understood that a beam of light, or other forms of energy, capable of selectively affecting a sensitive surface of a disc master, could be substituted for the beam of electrons.

What is claimed is:

1. An apparatus for recording signals by directing a beam of energy toward a disc master; said beam of energy having characteristics representative of signals to be recorded; said disc master having characteristics responsive to said beam of energy; said apparatus comprising the combination of:
   (1) a frame;
   (2) a base plate secured to said frame;
   (3) a non-translatable turntable;
   (4) means secured to said base plate for rotatably supporting said non-translatable turntable;
   (5) means coupled to said non-translatable turntable for causing rotational motion of said turntable;
   (6) a cover plate mounted to said frame; said cover plate defining a recording chamber, surrounding said turntable, in cooperation with said base plate;
   (7) a carriage;
   (8) bearing means secured to said cover plate for supporting a translational motion of said carriage relative to said cover plate;
   (9) a translatable recorder column for providing a signal representative beam of energy;
   said recorder column being secured to said carriage for translational motion therewith;
   said carriage and said cover plate having openings through which a portion of said recorder column protrudes into said recording chamber;
   said opening in said cover plate having dimensions which permit said translational motion of said recorder column;
   said carriage bearing means being so oriented that said translational motion of said carriage results in a motion of said beam of energy along a path radially disposed with respect to the center of said turntable;
   (10) means coupled to said carriage for causing said translational motion of said recorder column in correlation with said rotational motion of said turntable;
   (11) beam set-up means including a non-translatable stage; said non-translatable set-up stage being fixedly mounted within said recording chamber adjacent the outside perimeter of said turntable; said non-translatable set-up stage having a reference surface which is responsive to said beam of energy; said translational motion causing means additionally serving to selectively position said translatable recorder column in alignment with said non-translatable set-up stage in order to permit directing of said beam of energy onto said reference surface of said non-translatable set-up stage for detecting pertinent characteristics of said beam of energy;
   (12) means for releasably securing a disc master to said non-translatable turntable such that the recording surface of said disc master is disposed in registration with said reference surface of said non-translatable set-up stage;
   (13) means for selectively evacuating said recording chamber; and
   (14) means coupled between said translatable recorder column and said cover plate opening for preventing leakage of air into said recording chamber through said cover plate opening, when said recording chamber is evacuated.

2. A system as defined in claim 1 wherein said beam of energy comprises a beam of electrons; wherein said non-translatable stage of said beam set-up means includes a Faraday cup for determining the intensity of said electron beam.

3. A system as defined in claim 1 wherein said reference surface of said non-translatable set-up stage additionally supports a specimen; wherein said specimen comprises small particles of an energy-reflective material dispersed against a relatively energy-absorbing background; said recorder column including means for scanning said beam of energy across said specimen; said system including means responsive to energy scattered by said energy-reflective particles of said specimen for producing a control signal during said scanning of said specimen; said system further including means responsive to said control signal for displaying the shape and quality of said beam of energy.

4. An apparatus as defined in claim 1 wherein said supporting means for said turntable comprises:
   (1) a shaft secured to said turntable; said base plate having an opening through which said turntable shaft protrudes outside said recording chamber; and
   (2) bearing means secured to said base plate, and located outside said recording chamber, for rotatably supporting said protruding portion of said turntable shaft;
   said apparatus further including means coupled between said rotatable turntable shaft and said base plate opening for preventing leakage of air into said recording chamber through said base plate opening, when said recording chamber is evacuated.

5. An apparatus as defined in claim 1 wherein said turntable rotation motion causing means are also located outside said recording chamber, and coupled to said protruding portion of said turntable shaft for transmitting rotational motion to said turntable.

6. An apparatus as defined in claim 1 further including bearing means secured to said frame for supporting movement of said cover plate relative to said base plate between a first location and a second location;
   said cover plate in said first location permitting access (1) to said disc master supporting surface of said turntable, and (2) to said protruding portion of said recorder column; and
   said cover plate in said second location overlying said base plate to define said recording chamber.

7. A system as defined in claim 1 wherein said recorder column further includes lens means for obtaining proper focus of said beam of energy on said reference surface of said set-up stage; said system additionally including means for adjusting the focal length of said lens means of said recorder column in response to variations in the height of said responsive surface of said disc master relative to the height of said reference surface of said set-up stage in order to maintain proper focus of said beam of energy on said responsive surface of said disc master throughout the translational motion of said recorder column over said disc master.

* * * * *

UNITED STATES PATENT OFFICE
CERTIFICATE OF CORRECTION

PATENT NO. : 4,074,313
DATED : FEBRUARY 14, 1978
INVENTOR(S) : JOHN HENRY REISNER, ET AL.

It is certified that error appears in the above-identified patent and that said Letters Patent are hereby corrected as shown below:

Col. 2, line 1
   Change "distributed" to --disturbed--

Col. 6, line 21
   Change "secontional" to --sectional--

Col. 6, line 27
   Change "reciprocale" to --reciprocal--

Signed and Sealed this

Tenth Day of October 1978

[SEAL]

Attest:

RUTH C. MASON
*Attesting Officer*

DONALD W. BANNER
*Commissioner of Patents and Trademarks*